United States Patent
de Lamberterie (10) Patent No.: US 8,920,006 B2
(45) Date of Patent: Dec. 30, 2014

(54) LIGHTING OR SIGNALING DEVICE FOR A MOTOR VEHICLE

(75) Inventor: Antoine de Lamberterie, Paris (FR)

(73) Assignee: Valeo Vision, Bobigny (FR)

( * ) Notice: Subject to any disclaimer, the term of this patent is extended or adjusted under 35 U.S.C. 154(b) by 818 days.

(21) Appl. No.: 12/244,864

(22) Filed: Oct. 3, 2008

(65) Prior Publication Data

US 2009/0091944 A1   Apr. 9, 2009

(30) Foreign Application Priority Data

Oct. 4, 2007 (FR) .................................. 07 06982

(51) Int. Cl.
*F21V 9/00* (2006.01)
*G02B 19/00* (2006.01)
*F21S 8/10* (2006.01)
*F21V 8/00* (2006.01)
*F21Y 101/02* (2006.01)

(52) U.S. Cl.
CPC ......... *F21S 48/1329* (2013.01); *G02B 19/0028* (2013.01); *F21S 48/2281* (2013.01); *F21S 48/2243* (2013.01); *G02B 6/0045* (2013.01); *F21Y 2101/02* (2013.01); *F21S 48/10* (2013.01); *F21S 48/2262* (2013.01); *F21S 48/1241* (2013.01); *G02B 19/0061* (2013.01)
USPC ............................................ 362/511; 362/507

(58) Field of Classification Search
USPC .......... 362/549, 516, 509, 520, 517, 518, 545
See application file for complete search history.

(56) References Cited

U.S. PATENT DOCUMENTS

| 6,536,921 | B1 * | 3/2003 | Simon ........................... 362/277 |
| 6,945,672 | B2 * | 9/2005 | Du et al. ....................... 362/241 |
| 6,997,587 | B2 * | 2/2006 | Albou ........................... 362/516 |
| 7,073,931 | B2 * | 7/2006 | Ishida ........................... 362/539 |
| 7,207,705 | B2 | 4/2007 | Ishida |
| 7,401,947 | B2 | 7/2008 | Wanninger et al. |
| 2006/0083013 | A1 | 4/2006 | Wanninger et al. |
| 2006/0087860 | A1 | 4/2006 | Ishida |
| 2006/0234612 | A1 | 10/2006 | Gotthardt |
| 2006/0285347 | A1 * | 12/2006 | Okada ........................... 362/516 |
| 2007/0211487 | A1 | 9/2007 | Sormani |

FOREIGN PATENT DOCUMENTS

| DE | 102005019093 A1 | 10/2006 |
| EP | 1630576 A2 | 3/2006 |
| FR | 2769971 A1 | 4/1999 |
| WO | 2006033040 A1 | 3/2006 |
| WO | 2006096467 A2 | 9/2006 |
| WO | 2007040527 A1 | 4/2007 |

* cited by examiner

*Primary Examiner* — Jason Moon Han
*Assistant Examiner* — Jessica M Apenteng
(74) *Attorney, Agent, or Firm* — Jacox, Meckstroth & Jenkins (57) ABSTRACT

A lighting or signalling device for a motor vehicle, having an optical axis and comprising at least one light source and at least one guide for the light rays between the source and an exit face, the guide having an entry edge associated with the source. The guide for the light rays is formed by a sheet and the sheet comprises a curved rear edge convex towards the rear, able to provide reflection of the light rays towards the exit face. A curved shape of the rear edge being associated with the profile of the exit face so that the emerging light rays have a direction contained in a substantially horizontal plane containing the optical axis of the device.

31 Claims, 7 Drawing Sheets

LIGHTING OR SIGNALING DEVICE FOR A MOTOR VEHICLE

CROSS-REFERENCE TO RELATED APPLICATIONS

This application claims priority to French Application No. 0706982 filed Oct. 4, 2007, which application is incorporated herein by reference and made a part hereof.

BACKGROUND OF THE INVENTION

1. Field of the Invention

The invention relates to a lighting or signaling device for motor vehicles, comprising at least one light source and at least one guide for light rays between the source and an exit face.

2. Description of the Related Art

Lighting or signaling devices of this type are known, in particular from the patent application WO 2006/096467, which is related to U.S. Provisional Application 60/658,459. This document discloses a lighting device that comprises a ray guide in the form of solid pieces that are tricky and expensive to produce. Performance in terms of range is reduced because of only moderately satisfactory collimation. In addition, the dimensions of the whole are relatively large.

SUMMARY OF THE INVENTION

An aim of the invention is in particular to provide a lighting or signaling device of the type defined above, the compactness of which is small, in particular in terms of width, and the performance of which is enhanced. It is also sought for the industrial feasibility of the device to be ensured, in particular for molding the parts of the device. It is also desirable for the device to be of great flexibility with regard to the light sources that can be used.

According to the invention, a lighting or signalling device, for a motor vehicle, is defined as follows:

It has an optical axis and comprises at least one light source and at least one guide for the light rays between the source and an exit face, the guide having an entry edge associated with the source, and:
  the guide for the light rays is formed by a sheet,
  and the sheet has a curved rear edge convex towards the rear, able to provide reflection of the light rays towards the exit face,
  the curved form of the rear edge being associated with the profile of the exit face so that the emerging light rays have a direction contained in a substantially horizontal plane containing the optical axis of the device.

Here and throughout the present text, "horizontal", "vertical", "oblique", "top", "bottom" and any other term relating to a position indication means indications relating to the device or one of its components, the device being in a position of mounting in the vehicle (this device may be an independent lighting or signaling module intended to be installed directly in the vehicle, it may also be integrated in a headlight or light, themselves intended to be installed in a vehicle). Those indications are aimed at clarifying the relative positioning of the different components according to the invention, but the invention is not strictly limited to those terms.

Likewise, throughout the present text, the terms "front" and "rear" are to be understood by considering the direction of propagation of the light emerging from the lighting device towards the front.

In addition, "entry edge (Ne) associated with the source" also means the fact that the source can be directly applied against or in the immediate vicinity of the entry edge. However, this expression also includes configurations where the source is not in direct contact with the edge, in particular the configuration where provision is made for interposing at least one optical component of the collector or simple light conduit type between the source and the edge, for example in order to improve/augment the quantity of light entering the sheet through this edge by further limiting leakages of light, and/or in order to keep the possibility of offsetting the source, for reasons of size or others.

It should be noted that this collector may be made in one piece with the entry edge.

Advantageously, the sheet lies between two large faces parallel to each other. It is understood by this that the sheet preferably has a substantially constant thickness. The faces of the sheet may be planar or curved.

Preferably the exit face (B) extends transversely to or obliquely with respect to the entry edge (Ne).

The entry edge may be planar or not, in particular curved.

The light source may have a large dimension that is disposed perpendicular to the longitudinal direction of the entry edge, the thickness of the sheet being at least equal to the large dimension of the source in order to cover it completely. This case preferably concerns more particularly the case where the emitting surface of the light source is of the rectangular type.

The light source may be an LED formed by the association of several emitting chips of the LED type, in particular aligned substantially perpendicular to the longitudinal direction of the entry edge.

Preferably the exit face is situated in a plane orthogonal to the entry edge and the rear edge has a parabolic shape having a focus situated on the light source.

The sheet may be planar. It may in particular be disposed vertically or horizontally or obliquely.

The device may comprise an end piece extending the exit face and having, in cross section through a plane parallel to the entry edge, the convex form of a convergent lens making it possible to at least partially collimate the light in a plane parallel to the entry edge.

The device may comprise several sheets up against each other, the sheets being contiguous above the source, and separating progressively to make it possible to juxtapose exit end pieces. Advantageously, the device comprises three sheets up against each other, namely a planar central sheet lying between two lateral sheets delimited by portions of spherical surfaces.

When the entry edge of the sheet is in a horizontal plane and the exit face is vertical, the focus of the parabolic rear edge is situated on the rear edge of the source so that the emerging rays are horizontal or are directed downwards below a cutoff line.

The profile of the exit face may be convex towards the front while the profile of the rear edge is associated for an exit of the rays parallel to the axis. In particular, the profile of the exit face may be elliptical, convex towards the front, while the rear edge is convex towards the rear in the form of an arc of a hyperbola, a first focus of which is merged with the focus of the elliptical profile and the second focus of which corresponds to the virtual image of the first focus given by the rear edge.

The sheet may comprise a through opening with a closed contour, delimited in its bottom part by a parabolic edge, the focus of which is situated at the point where the light source is placed and the geometric axis of which is merged with the optical axis of the device, the top profile of the opening being chosen so as to be able to have the light rays emitted towards the rear pass round it and, in order to ensure a double internal reflection of the rays directed towards the rear, the rear edge of the sheet has a first total reflection part and a second part also with total reflection returning the rays parallel to the entry edge.

Advantageously, the first part of the rear edge of the layer is formed by a secondary parabola, the focus of which is merged with that of the parabolic edge but the axis of which is directed upwards, while the second part of the rear edge is formed by a straight top face.

Preferably, the angle at which the rear edge of the sheet is seen from the light source extends on each side of the normal to the source at least at an angle equal to or greater than 30°, 35° or 40° (and preferably no more than 50° to 60°, in order not the have to increase the size of the sheet). According to a variant, there is interposed between the source (S°) and the entry edge (Ne) of the sheet at least one optical element (Co) of the optical conduit or optical collector type. This element or elements will therefore conduct the light from the source in the sheet and thus become a secondary light source. The invention consists, apart from the provisions disclosed above, of a certain number of other provisions that will be dealt with more explicitly below with regard to example embodiments described with reference to the accompanying drawings, but which are in no way limitative.

DETAILED DESCRIPTION OF THE PREFERRED EMBODIMENTS

Figure 1:
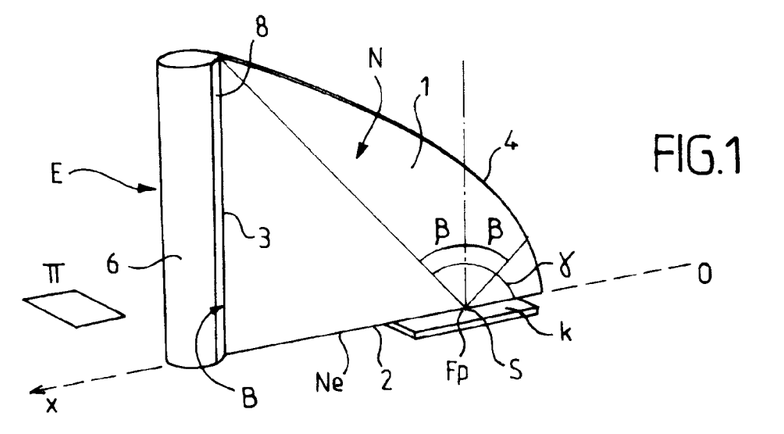
FIG. 1 is a schematic view in perspective, three quarters front right, of a lighting and signaling device according to the invention.

Referring to FIG. 1, a lighting or signaling device E, for a motor vehicle, can be seen, which comprises at least one light source S and at least one guide N for the light rays between the source S and an exit face B. The guide N, made from transparent material, has an exit edge Ne applied against the source S.

According to the invention, the guide N is formed by a sheet 1, or plate, lying between two large parallel faces delimited by a contour with three sides, respectively a side 2 extending along the longitudinal edge of the entry edge Ne, a side 3 extending along the exit face B and a convex curved rear edge 4. The exit face B extends transversely to the entry edge Ne. The rear edge 4 extends between the distant ends of the entry ends Ne and of the exit face B.

In the example in question, the entry edge Ne is rectilinear, situated in a horizontal plane, the sheet 1 is vertical and the exit face B is orthogonal to the entry edge Ne. This example is not limitative, the exit face B being in particular able to be convex towards the front as explained below with regard to FIG. 13.

In a variant, the sheet 1 could be horizontal just like the exit face B, or inclined to the horizontal plane. In this configuration, there is then an advantage in disposing the source so that its largest dimension is this time disposed substantially parallel to the entry edge Ne rather than more substantially perpendicular. The edge can then be less thick, since this time it corresponds to the smallest dimension of the source.

The sheet 1 has a constant thickness L (FIG. 2) corresponding to the width of the entry edge Ne and of the exit face B.

The curved shape of the rear edge 4 is associated with the profile of the exit face B so that the emerging light rays have a direction essentially parallel to the entry edge Ne, the aim sought being to have a direction of the rays that is contained in the horizontal plane $\pi$ containing the optical axis (Ox).

Figure 2:
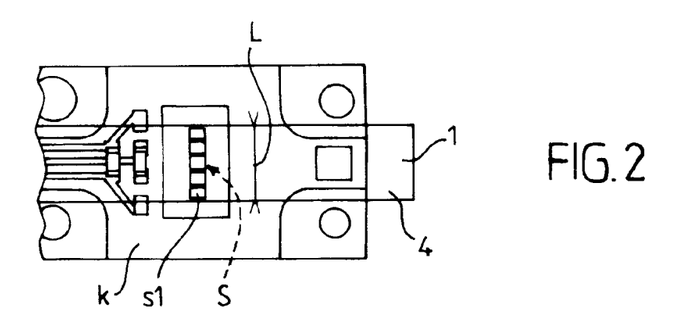
FIG. 2 is a partial view from above of the guide sheet and the light source disposed above this sheet.

In the example in FIG. 1, the exit face B is planar, orthogonal to the entry edge Ne. The rear edge 4 is then formed by an arc of a parabola whose geometric axis is parallel to the plane $\pi$ and is in this example parallel to the large dimension of Ne. The focus Fp of the parabola of the rear edge 4 is situated on the edge Ne towards the rear. The center, or another point, of the source S is placed at the focus Fp. The source S preferably consists of at least one light emitting diode designated LED as an abbreviation, advantageously provided with a planar protective plate (this is in fact the type of LED most suitable when it is necessary to put it up against the edge Ne, itself planar. However, it is also possible to use LEDs whose emitting surface is protected by a dome for example. The source S (its emitting surface) generally has in this example an elongate rectangular shape: its large side is disposed orthogonal to the mid-plane of the sheet 1, as can be seen in FIG. 2. In the example in FIG. 2, the light source S is formed by five aligned square chips s1, with a side measuring 1 mm. The thickness L of the plate 1 is slightly greater than the largest dimension of the light source, that is to say in this case slightly greater than 5 mm. The source S is disposed on a support plate k comprising a printed circuit for the connections of the LED.

An optimum configuration consists firstly of putting the protective layer of the LEDs and the entry edge Ne of the guide N as close as possible together, with possible contact, and, secondly, orienting the large dimension of the light source along the thickness of the sheet 1, in the case shown where the sheet is oriented substantially vertically.

The exit face B is advantageously supplemented by a wider end piece 6, which may be made in one piece with the guide sheet 1, or which may be attached in contact with the exit face B. This end piece 6 has a thickness G (FIG. 4) greater than the thickness L of the sheet 1.

Figure 3:
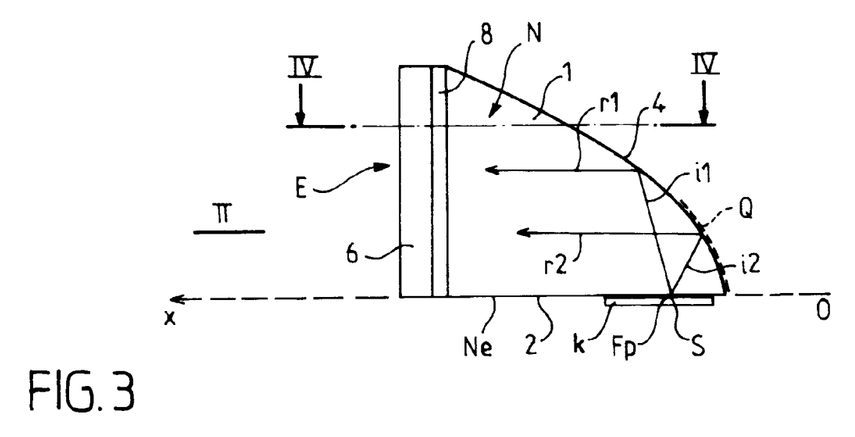
FIG. 3 is a side view of the device of FIG. 1 to a smaller scale.
Figure 4:
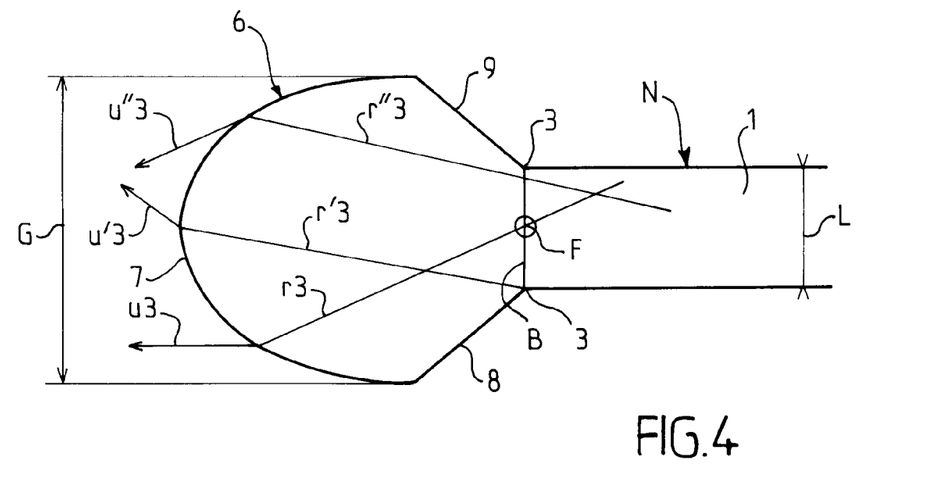
FIG. 4 is a partial horizontal cross section, to a larger scale, along the line IV-IV in FIG. 3.

In the example in FIGS. 1, 3 and 4, the end piece 6 is formed by a solid having a cylindrical front part and a prismatic rear part, with rectilinear generatrices orthogonal to the entry edge Ne and therefore vertical in the example in question. The transverse section of the end piece 6 through a plane parallel to the plane of the entry edge, visible in FIG. 4, comprises towards the front an elliptical convex part 7 defining a lens whose focus F is situated at the middle of the exit face B. The rear zone of the elliptical part 7 is extended by two oblique vertical planar walls 8, 9, converging towards the rear in order to be connected to the vertical edges 3 of the exit face B.

The LEDs of the light source emit a beam along approximately a half-plane.

When the beam enters the sheet, the diverging angle of the beam is $\pm\beta$, on each side of the normal to the emitting surface, generally around $\pm 40°$. The value of $\beta$ will depend on the refractive index of the material making up the sheet, and will be approximately 38° when the sheet is made from polycarbonate PC. The extent of the rear edge 4 of the plate 1 is chosen so that the angle $\gamma$ (FIG. 1) at which this rear edge is seen from the light source S extends on each side of the normal to the source S at least at an angle $\beta$ of approximately 40° in general, in order to recover a maximum amount of the light flux issuing from the source.

FIG. 3 shows the optical principle of the basic concept: all the rays emitted by the light source between the sheet 1 in order to be guided therein in the lateral direction perpendicular to the plane of FIG. 3, and then in order to be collimated therein in the direction of the optical axis, in the vertical plane of FIG. 3.

A ray i1 situated in the plane of FIG. 3, emitted by the source S and inclined forwards with respect to the normal to the source, in general has an angle of incidence on the rear edge 4 greater than the total reflection angle. This ray is reflected in a ray r1 parallel to the optical axis.

A ray i2 emitted by the source S towards the rear generally has an angle of incidence less than the total reflection angle. To provide reflection, the bottom area Q of the rear edge is covered with a reflective layer, in particular this area is aluminized. The ray i2 is then reflected in a ray r2 parallel to the optical axis and to the ray r1.

Thus collimation is provided (that is to say a beam of parallel rays) in the direction of the optical axis, in the vertical plane.

FIG. 4 shows the exit profile in section through a horizontal plane. From the exit face B, this profile if first of all prismatic, broadening between the planar faces 8, 9 in order to make it possible to stop any reflection on the sides, and then takes an elliptical form 7 for the exit. Any ray such as r3 situated in a horizontal plane and passing through the rear focus F of the arc of ellipse 7 leaves parallel to the optical axis, in a ray u3. By disposing the exit face B of the sheet 1 at the focus F, partial collimation of the emerging rays such as u3 in the horizontal plane is permitted in order to guarantee at the output a narrow beam.

Rays such as r'3 or r"3 that pass alongside the focus F emerge in rays u'3 or u"3 inclined to the optical axis.

The invention therefore develops from a basic principle making it possible to fulfill a lighting function of the main beam type, that is to say a function with a fairly high intensity.

It will be understood that, with such a system:
the beam is very narrow, which is well suited to beams of the main beam, fog or motorway ("motorway" in English), additional bending light ("bending light" in English) or similar type;
the width of the beam depends on the focal length and therefore the dimension of the arc of ellipse 7 and the thickness of the sheet 1, and therefore the length of the source S.

A large dimension G of the exit end piece 6 often gives rise to difficulties in production since the piece is molded from transparent plastics material. Typically, this dimension G is limited to approximately 13 mm for a piece made from plastics material. On the other hand, if the piece is produced from glass, greater thicknesses G are acceptable.

Figure 5:
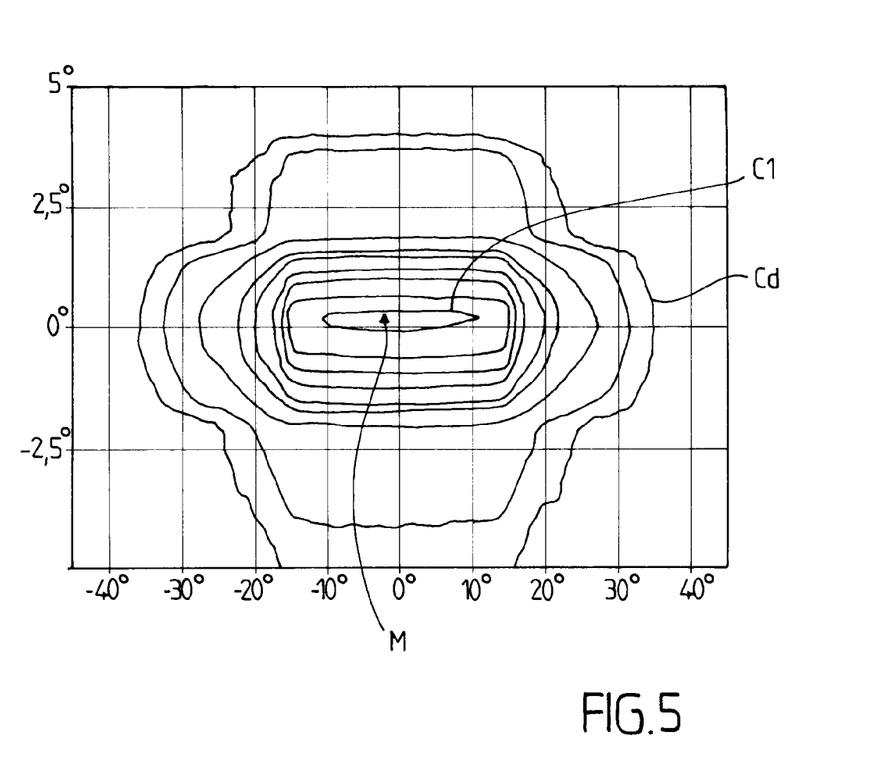
FIG. 5 is a network of isolux curves obtained with a first exit end piece of the lighting device according to FIG. 1.

FIG. 5 illustrates a network of isolux curves obtained with a guide sheet 1 whose thickness is equal to 5 mm and with a thickness G of end piece equal to 12.4 mm. The isolux curves are obtained on a screen placed at 25 meters from the lighting device, perpendicular to the optical axis, whose intersection with the screen corresponds to the graduation 0° on the X axis. The vertical axis passing through 0° corresponds to the intersection of the screen and the vertical plane passing through the optical axis.

The X axis is graduated in degrees of angle on each side of the vertical axis and of the optical axis. The Y axis is graduated in degrees of angle above and below the horizontal plane passing through the X axis.

The point M is situated in the vicinity of the crossing between the horizontal and vertical axes and corresponds to the point on the beam whose illumination is maximum. This point M is surrounded by ever larger closed curves, with a rectangular appearance for the closest to M, corresponding to less and less great illuminations. Each curve corresponds to a constant value in lux that decreases from the point M towards the outside. In the case of FIG. 5, the point M corresponds to 20.8 lux; the first closed curve C1 surrounding M corresponds to 19.2 lux.

The beam in FIG. 5 can be suitable for a function of the very wide main beam type, four to five identical devices or modules then being necessary to provide the complete function. The efficiency (defined by the ratio between the light energy collected and the energy emitted by the source) is good, around 50.5%. Only the range (which depends on the value in lux of the point M) is small and requires placing four to five identical modules alongside one another in order to provide the complete main beam lighting function.

Figure 6:
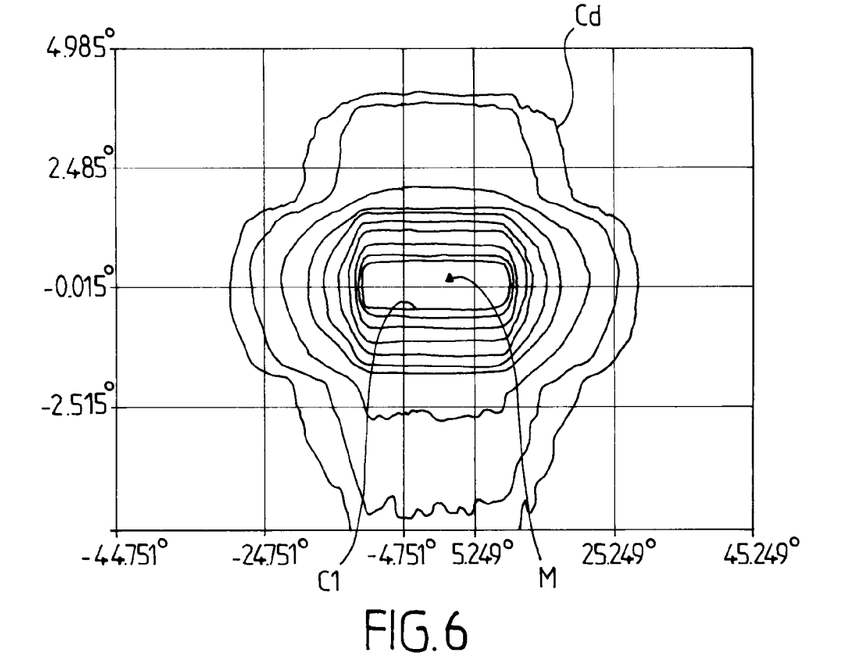
FIG. 6 is a network of isolux curves obtained with an exit end piece thicker than in the case of FIG. 5.

FIG. 6 is a network of isolux curves similar to that in FIG. 5 but obtained with an end piece 6 with a greater thickness G, equal to 18 mm, whereas the thickness of the sheet 1 remains equal to 5 mm.

In the case of FIG. 6, the point M corresponds to 28 lux; the first closed curve C1 surrounding M corresponds to 22 lux.

The efficiency is 52.5%.

The beam in FIG. 6 is even more suitable for the main beam function than that in FIG. 5. The maximum intensity has been improved, the efficiency is stable. Three or four identical juxtaposed modules will be sufficient to give a beam of very good quality.

Figure 7:
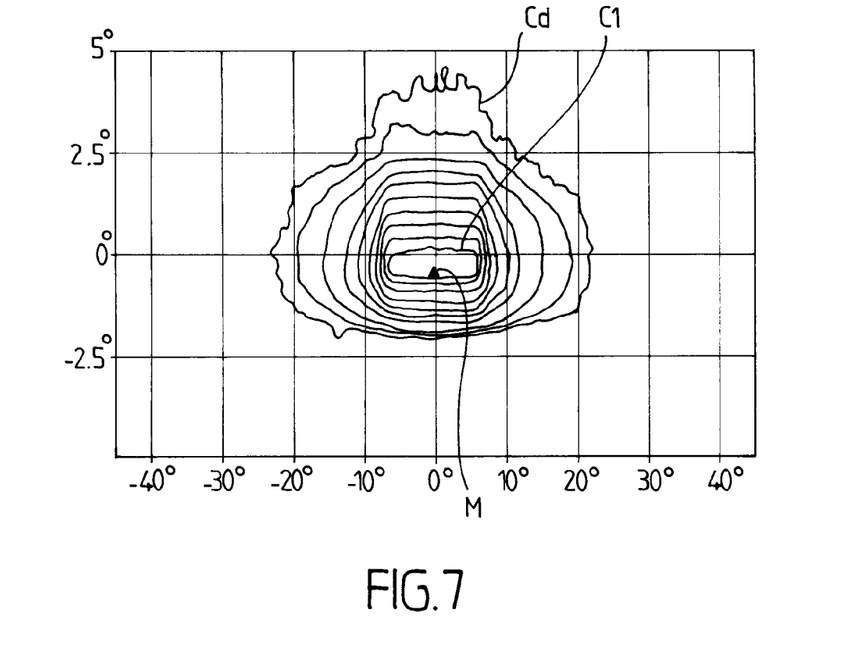
FIG. 7 is a network of isolux curves obtained with a lighting device whose sheet has a smaller thickness than for FIGS. 5 and 6.

FIG. 7 is a network of isolux curves obtained with a guide sheet 7 whose thickness L is equal to 2 mm while the thickness G of the end piece 6 is 12 mm.

In the case in FIG. 7, the point M corresponds to 24 lux; the first closed curve C1 surrounding M corresponds to 22 lux.

The efficiency is 61.2%.

The beam in FIG. 7 is also suitable for a function of the main beam type. The efficiency has been improved and the maximum intensity remains high. Four identical modules are necessary to fulfill the main beam function. However, as each light source of each module emits substantially half the flux as in the configurations in FIGS. 5 and 6 (the thickness of the sheet is lower than in the case in FIG. 7), the total flux required is half, whence a reduced cost and greater ease in cooling each LED.

Concerning the form of the end piece 6, total reflections have been found at the elliptically shaped diopter. It is advantageous to conform this profile 7 according to a "pseudo-elliptical" profile, which makes it possible both to collimate the light in the horizontal plane and to allow a slight divergence of the emerging light rays as soon as the risk of total reflection is reached.

Figure 8:
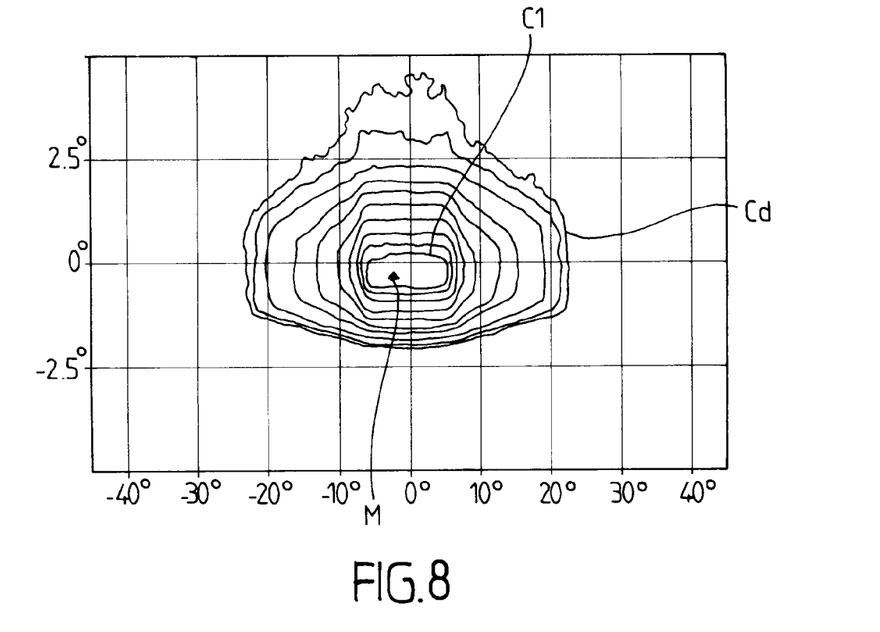
FIG. 8 is a network of isolux curves for a lighting device having the same sheet thickness as in FIG. 7 but whose exit face has a different, complex, shape.

FIG. 8 illustrates the network of isolux curves obtained under the same conditions as for FIG. 7, with the exception of the end piece 6 which, instead of having a strictly elliptical contour 7, has a complex output shape corresponding to a pseudo-elliptical contour. The efficiency is improved to 67.2%, with a maximum illumination of 25 lux.

In the case of FIG. 8, the point M corresponds to 25 lux; the first closed curve C1 surrounding M corresponds to 22 lux.

The basic configuration has an advantage when the size of the emitters (light sources) is low. The optimum is situated for emitters with dimensions of 2×1 mm and supplying 200 to 250 lumens.

Failing such sources, it is possible to keep LEDs at four of five inches but on which several adjacent guide layers are placed.

Figure 9:
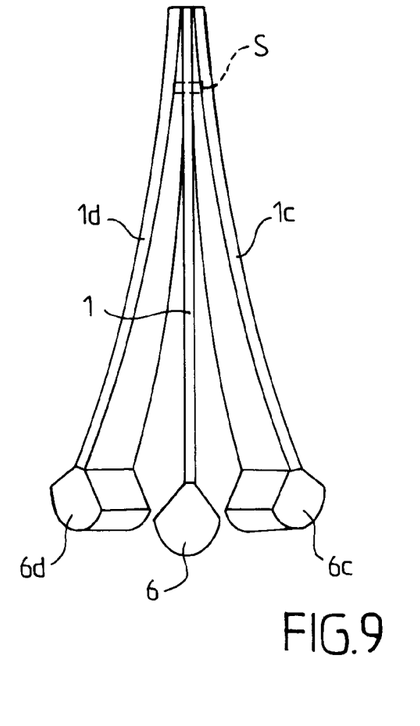
FIG. 9 is a plan view of a lighting device with three sheets.

FIG. 9 illustrates, in plan view, an arrangement with three contiguous guide sheets 1, 1c, 1d that are tangent at the LED or LEDs forming the light source S, which makes it possible to harvest all the flux emitted. The sum of the thicknesses of the three layers above the LED or LEDs is at least equal to the length of the emitter disposed perpendicular to the entry edges of the sheets.

To avoid a sheet interfering with its neighbor at the end pieces 6, 6c, 6d, a central sheet 1 is provided situated in a vertical plane and, on each side, a sheet 1c, 1d delimited by parallel spherical surface zones separating in the opposite direction to the central sheet 1.

Figure 10:
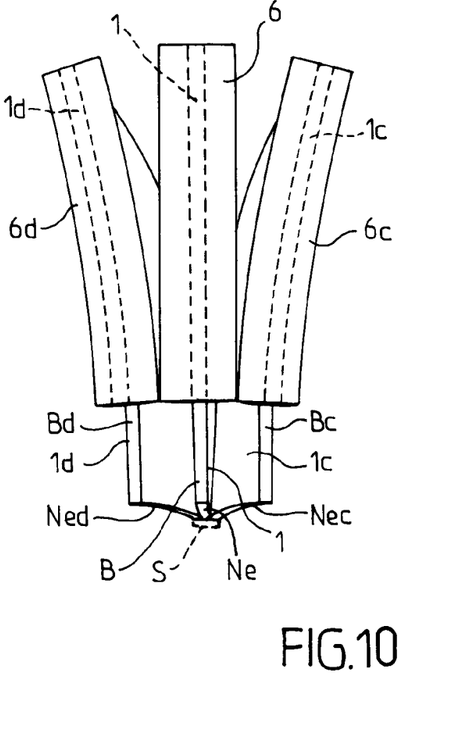
FIG. 10 is an end view of the device in FIG. 9.

FIG. 10 shows the device or modules of FIG. 9 in front view. The end pieces 6c, 6d are tangent to the central end piece 6 at the bottom part and separate progressively from the central end piece 6 upwards.

The bottom part of the end pieces 6, 6c, 6d is situated higher than the entry edges Ne, Nec, Ned of the sheets 1, 1c, 1d and the source S. This is because there are no light rays coming from the source in the bottom part of the exit faces so that the presence of end pieces is not useful in this part.

The central end piece 6 is of the same nature as those used in the example embodiments in FIG. 1 or 3. The lateral end pieces 6c, 6d are calculated so as to favor the sending of light in the axis but avoiding the risks of loss of lux because of total reflection.

FIG. 10 shows the very original style obtained in the form of "rods" corresponding to the end pieces 6, 6c, 6d with a very acceptable width, and an also acceptable height.

Figure 11:
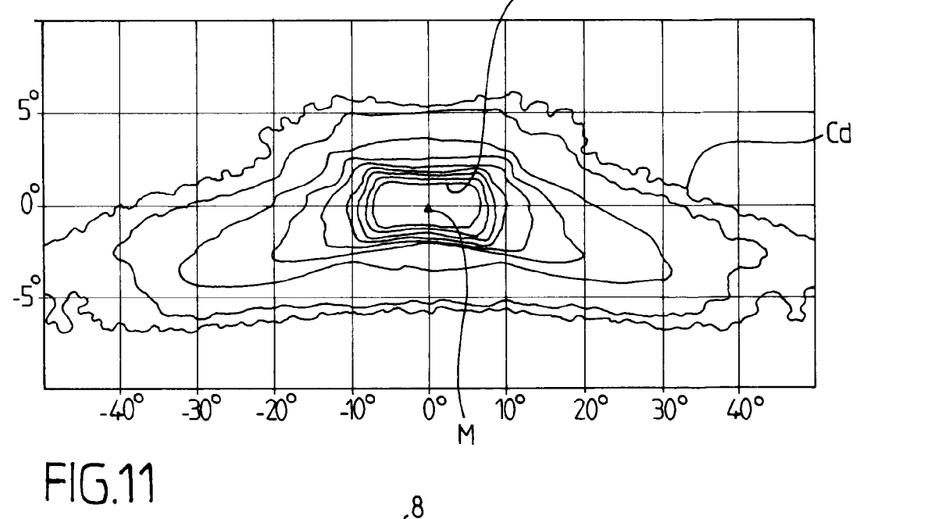
FIG. 11 is a network of isolux curves obtained with a device according to FIGS. 9 and 10.

FIG. 11 illustrates the network of isolux curves obtained with a lighting device according to FIGS. 9 and 10, this network having the required characteristics for a main beam.

In the case of FIG. 11, the point M corresponds to 45 lux; the first closed curve C1 surrounding M corresponds to 22 lux.

The efficiency is 70%. In the case where it is possible to use LEDs giving a flux of approximately 500 lumens, only two identical modules are necessary to fulfill the function with good results.

The light beams obtained with the lighting devices described up till now do not have any cutoff, that is to say a boundary between a light zone and a dark zone for avoiding dazzling of drivers or persons coming in the opposite direction to the vehicle in question. Such a cutoff is essential in light beams intended for fulfilling functions such as: dipped, fog, additional motorway (additional motorway), additional bending, additional dipped ray, and the like.

Figure 12:
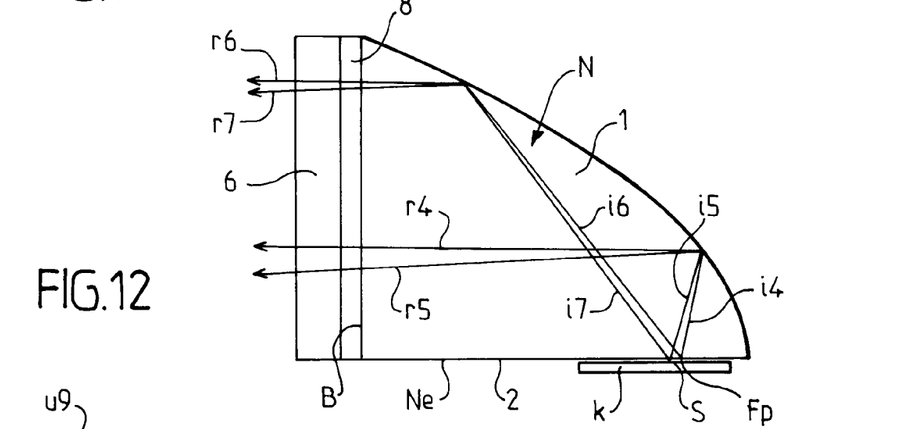
FIG. 12 is a side view, to a larger scale than FIG. 3, illustrating the formation of a beam with cutoff.

A cutoff can be achieved by disposing the light source S so that the focus Fp of the parabola constituting the rear edge 4 is situated on the rear edge of the source S instead of being situated at the centre of this source.

With such an arrangement, as illustrated in FIG. 12, a light ray i4 coming from the rear edge of the light source and therefore from the focus Fp is reflected in a ray r4 parallel to the axis of the parabola and to the entry edge Ne. In the example in question the ray r4 is horizontal. It will remain in a horizontal plane at the exit from the device.

All the other light rays emitted by the light source will come from points situated in front of the rear edge of the source, such as the ray i5. This ray i5 is reflected in a descending ray r5.

Another ray i6 coming from the rear edge will be reflected in a horizontal ray r6 while another ray i7 coming from a point situated in front of the rear edge will be reflected in r7 directed downwards.

The beam obtained will therefore have a horizontal cutoff line with an illuminated zone below this cutoff line and a dark zone above.

In the above example embodiments, the front exit face B of the sheet remains planar and vertical according to the embodiments envisaged, and the end piece 6 has rectilinear generatrices.

For reasons of compactness and/or style, it may be desirable to propose an alternative according to which the front face of the lighting device has a shape convex towards the front in the plane of the sheet, generally in a vertical plane.

Figure 13:
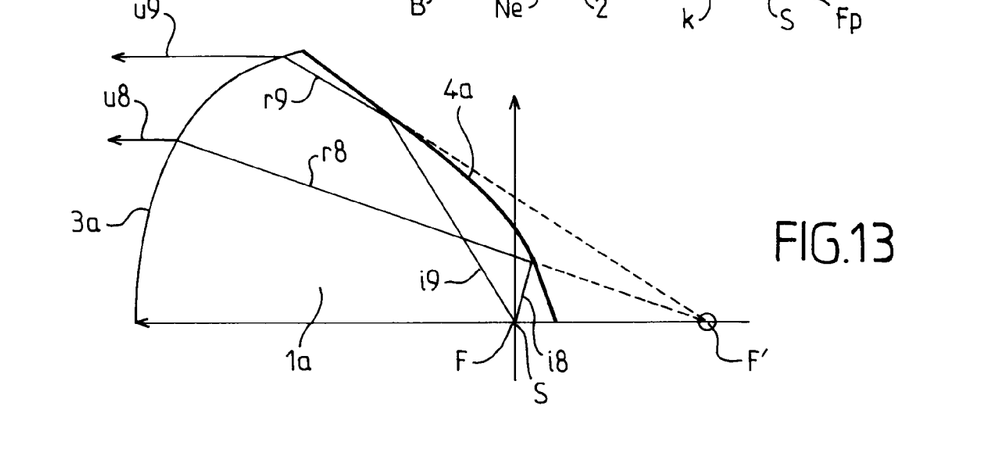
FIG. 13 is a schematic side view of a device whose exit face is convex towards the outside.

A simple example of this configuration is illustrated by FIG. 13. The exit face of the sheet 1a is convex towards the front, in the vertical plane, in an elliptical profile 3a whose parameters are determined by the optical index of the sheet. This elliptical profile 3a has a rear focus F'.

The rear edge of face 4a of the sheet 1a has a hyperbolic profile turning its convexity towards the rear. This profile has a first focus F situated on the light source S, for example at its centre, and a second focus merged with that F' of the profile 3a. A ray i8, i9 coming from the focus F and falling on the rear edge 4a is reflected in a ray r8, r9 that seems to come from the virtual focus F' that is the image of F given by the rear edge 4a. The rays r8, r9 that seem to come from F', the focus of the elliptical profile 3a, will emerge from the sheet 1a in horizontal rays u8, u9 parallel to the optical axis.

It is possible to combine the vertical elliptical profile 3a with a horizontal profile, also elliptical but having different parameters, in order to form an exit surface suitable for the required distribution of illumination.

It can be noted that, in this example embodiment, the reflection angles on the hyperbolic rear face 4a have values appreciably greater in the case of a parabolic rear face, which makes it possible more easily to keep total reflection and therefore to limit or even eliminate the aluminized zone of the rear part. Two advantages result from this: firstly the expensive aluminizing process is no longer necessary and secondly the losses with regard to reflection become negligible.

Figure 14:
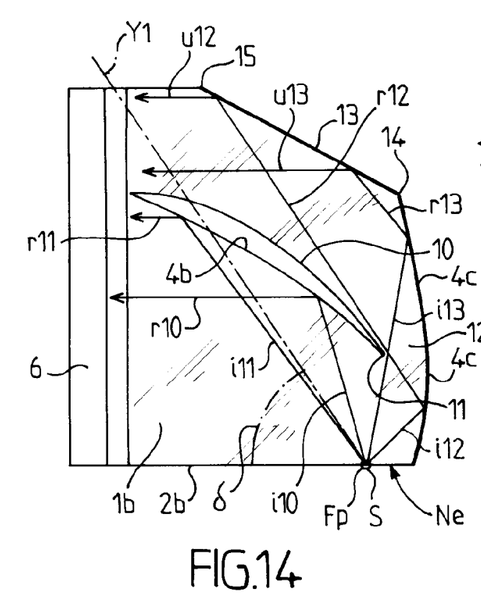
FIG. 14 is a side view of a variant embodiment of the device according to the invention providing two internal reflections for light rays emitted towards the rear.

Referring to FIG. 14, an embodiment can be seen in which the aluminizing is totally omitted without having recourse to a convex exit profile but providing a double internal reflection for some of the rays directed towards the rear.

The lighting device according to FIG. 14 has an exit end piece 6 with vertical rectilinear generatrices similar to that in FIGS. 3 and 4. The guide sheet 1b has a through opening 10 with a closed contour, which extends between the rear limit of the end piece 6 and an end 11 separated from the rear edge 4c by an area of transparent material 12.

The opening 10 is delimited in its bottom part by a parabolic edge 4b, the focus of which is situated at the point Fp where the light source S is placed, and the geometric axis of which (which constitutes the optical axis) is merged with the longitudinal axis of the entry edge 2b. The top profile of the opening 10 is chosen so as to be able to be easily passed round by the light rays emitted towards the rear by the source.

Light rays such as i10, i11 emitted by the source and encountering the diopter formed by the edge 4b are reflected in rays r10 and r11 parallel to the entry edge Ne.

Rays such as i12, i13 emitted towards the rear encounter the diopter formed by the rear edge 4c. According to the embodiment in FIG. 14, the profile of the edge 4c is an arc of a parabola having as its focus the point Fp, and as its axis the straight line Y1 (which passes through Fp) raised towards the front.

The rays i12 and i13 undergo an internal reflection on the rear edge 4c and are returned in rays r12 and r13 parallel to the axis Y1. The raised direction of the axis Y1 is chosen so that no reflected ray such as r12, r13 passes under the main parabola of the edge 4b.

The rear edge of the sheet 1b has at the top part a rectilinear section 13 rising from the rear towards the front. The intersection of the rear edge 4c and the section of the rear edge 13 is designated by the reference 14. The top end of the section 13 is formed by its intersection 15 with the horizontal top edge of the sheet 1b. The inclination of the section 13 is chosen so that the rays r12, r13 are reflected in rays u12 and u13 parallel to the entry edge Ne, that is to say horizontal according to the representation in FIG. 14. The rectilinear section 13 is parallel to the bisector of the angle δ formed between the axis Y1 and the direction of the entry edge Ne.

The arrangement in FIG. 14, involving two internal total reflections for the rays directed towards the rear, makes it possible to avoid aluminizing part of the rear edge of the sheet 1b, which gives rise to a reduction in the production cost and an improvement in the light yield.

Figure 15:
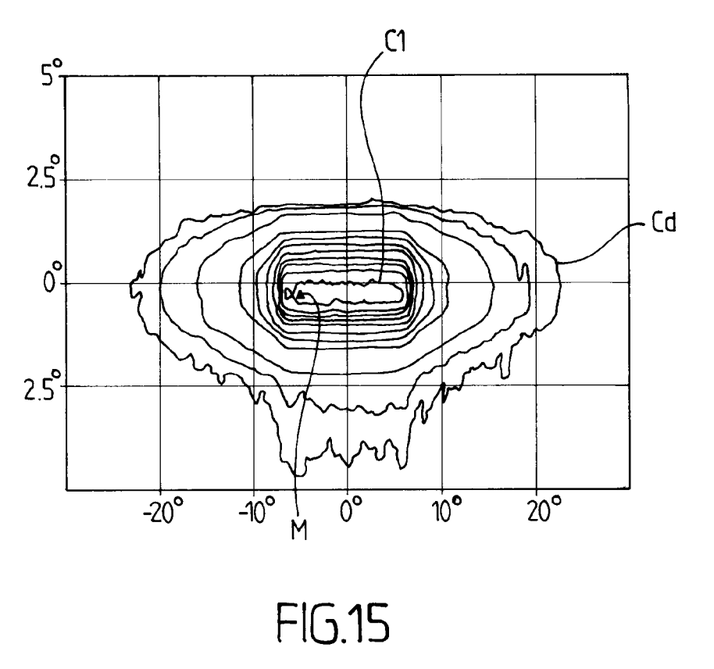
FIG. 15 is a network of isolux curves obtained with the device of FIG. 14.

FIG. 15 shows the photometric result obtained with a lighting device according to FIG. 14 to be compared with the isolux curves in FIG. 7. According to the results in FIG. 15, for the same type of light source as in FIG. 7, the light flux of the emerging beam is 168 lumens with an efficiency of 68%, as against 61% in the case of FIG. 7. The maximum intensity achieved is 19,000 candelas, for a maximum illumination of 30.5 lux as against 24.6 lux in the case of FIG. 7.

In FIG. 15, the point M corresponds to 30.5 lux; the first closed curve C1 surrounding M corresponds to 29 lux.

It will be noted that the remarkable improvements in performance with the device in FIG. 14 relate principally to the absence of aluminizing, which creates losses of approximately 20% for some of the rays.

Variant embodiments of the device in FIG. 14 are possible. Instead of forming two internal reflections with a first reflection on a parabolic face 4 and then a second reflection on a straight face 13, it is just as possible to use:

a straight face and then a second parabolic face;
or an elliptical face and then a parabolic face;
or a hyperbolic face and then a parabolic face.

As in the case in FIG. 13, it is also possible to have a convex exit face. The association of two internal reflections must then take account of this convex exit face.

In the case where two internal reflections are provided with a device of the type in FIG. 14, the formation of a cutoff beam still remains possible.

For the rays that undergo a single internal reflection on the principal parabola of the edge 4b, it is necessary for this principal parabola to have its focus Fp situated on the rear edge of the source S, as with FIG. 12.

Figure 16:
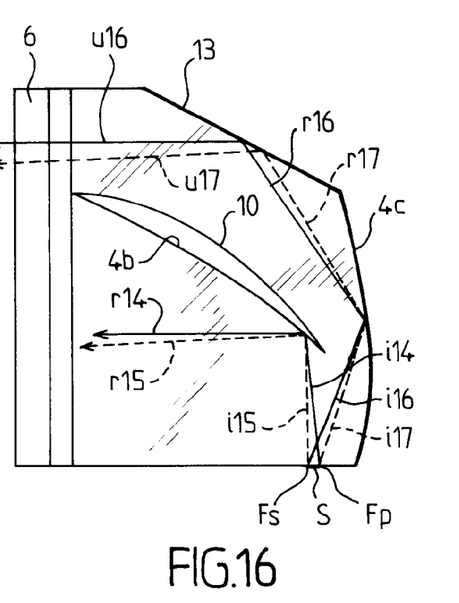
FIG. 16 is a side view of a lighting device according to FIG. 14, which makes it possible to obtain a beam with cutoff, part of this beam having undergone two internal reflections in the device.

On the other hand, for the rays that undergo two internal reflections and encounter the secondary parabola of the edge 4c and then the rectilinear section 13, it is necessary for the secondary parabola to have its focus Fs situated on front edge of the light source S. FIG. 16 illustrates such an arrangement.

A ray i14 emitted from the focus Fp on the rear edge of the source is reflected by the principal parabola 4b in a horizontal ray r14. A ray i15 emitted by the front edge of the source, situated in front of the focus Fp, is reflected in a descending ray r5.

A ray i16 coming from the focus Fs of the secondary parabola 4c is reflected in the ray r16, which is itself reflected by the straight top face 13 in a horizontal ray u16. On the other hand a ray i17 coming from the rear edge of the source will be reflected in a ray r17 and in a descending ray u17 at the exit. In all cases, a cutoff is obtained since the rays leave in a horizontal direction or in a descending direction.

Figure 17:
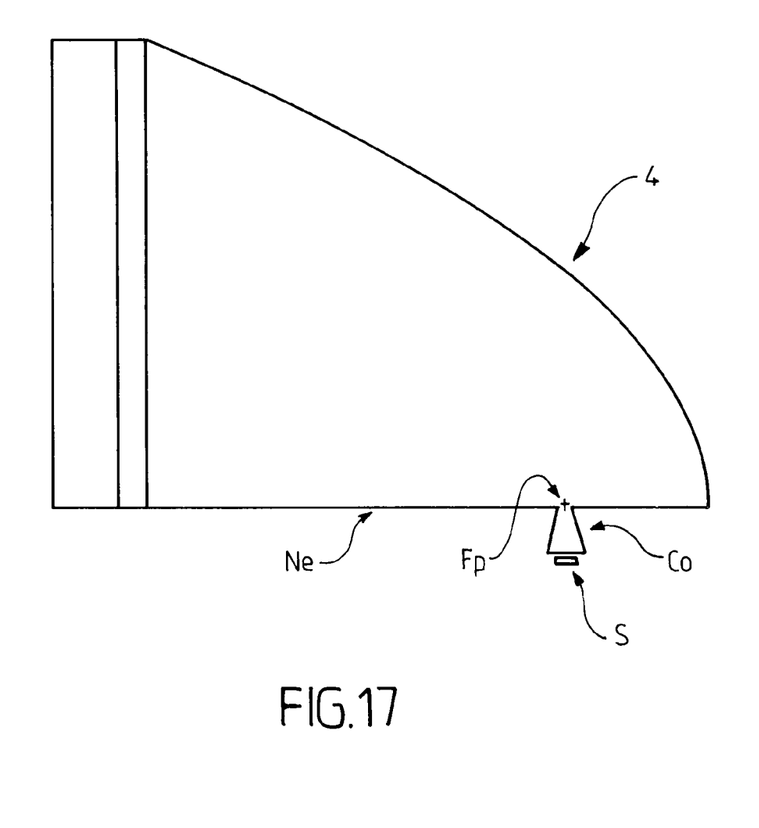
FIG. 17 is a side view of a variant of the device shown in FIG. 3.
Figure 18:
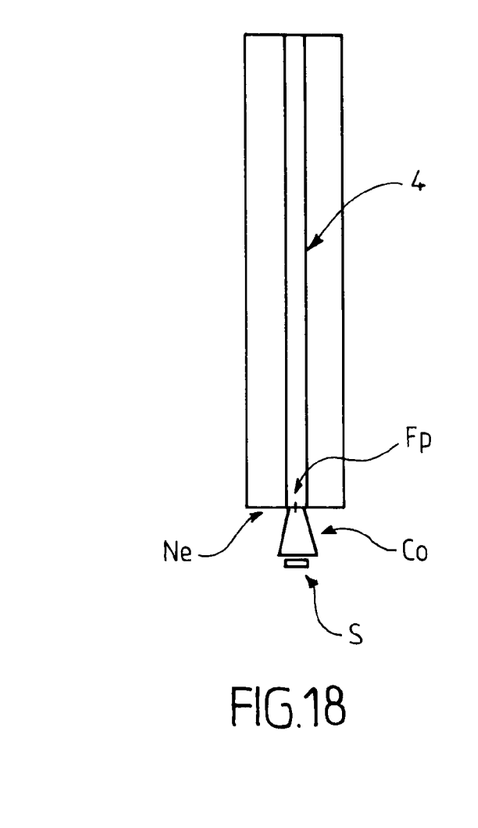
FIG. 18 is a view along a perpendicular plane of the variant of the device according to FIG. 17

FIGS. 17 and 18 relate to a variant of the example shown in FIG. 3 in particular. In this variant, the source S is no longer up against the edge Ne: the source is slightly offset, and an optical conduit Co has been placed between the source and the edge Ne at the focus of the parabola. When the source has an excessively large size, there is an advantage, as shown, in this component Co having conicity. In this way a secondary light source is created, which comprises substantially the same flux as the principal source S but which is smaller. This conicity will nevertheless cause a certain widening in the diverging angle of opening of the rays in the sheet. In the case in FIG. 17, the conicity is achieved in an axial direction, which causes an increase in the diverging angle β of the rays in the sheet, which can be compensated for/managed by increasing the angle γ at which the rear reflector is seen from the secondary source.

FIG. 18 can be considered as another view of the variant according to FIG. 17. It also corresponds to a second variant, where the conicity of the conduit Co takes place in a direction transverse to the sheet. The transverse diverging angle of the rays in the sheet is increased, which is acceptable as long as the total reflection limit is not reached.

It is possible without difficulty to associate both the configuration in FIGS. 17 and 18 while having a conduit Co that combines a conicity that is both axial and transverse.

A device according to the invention has many advantages, including the following:
  low compactness, in particular in terms of width;
  improved performance, in particular from the point of view of light efficiency;
  great flexibility: it is possible to use various types of source with one, two, three, four or five chips;
  industrial feasibility, the device being able to be molded in a single piece or in a variant the end piece 6, 6c, 6d being able to be attached at the end of the sheet 1, 1a, 1b, 1c, 1d.

While the forms of apparatus herein described constitutes preferred embodiments of this invention, it is to be understood that the invention is not limited to these precise forms of apparatus, and that changes may be made therein without departing from the scope of the invention which is defined in the appended claims.

What is claimed is:

1. A lighting or signaling device for a motor vehicle, said lighting or signaling device comprising:
    an optical axis and comprising at least one light source;
    at least one light guide for guiding light rays between said at least one light source and an exit face, said at least one light guide having an entry edge associated with said at least one light source;
    said at least one light guide for said light rays is formed by a sheet;
    said sheet being generally planar and comprising a curved rear edge adapted to provide reflection of said light rays towards said exit face; and
    a curved shape of said curved rear edge being defined by an arc of a parabola whose geometric axis is parallel to a substantially horizontal plane and also being associated with a profile of said exit face so that at least some of said light rays emerging from said exit face have a direction contained in said substantially horizontal plane containing said optical axis of said lighting or signaling device;
    said at least one light source being situated at substantially a focus of said curved shape;
    wherein said at least one light guide has an end piece having an end piece thickness that is greater than a sheet thickness of said sheet, said end piece further comprising a generally convex surface relative to said exit face and defining a lens having a focus situated generally at said exit face of said sheet;
    said end piece being formed by a solid having a cylindrical, elliptical or pseudo-elliptical profile in cross-section that defines said convex surface and that causes divergence of at least some of said light rays;
    said exit face of said sheet be disposed at said focus to partially collimate emerging light rays from said end piece and allows said divergence of at least some of said light rays;
    wherein said lighting or signaling device is adapted for use on a motor vehicle.

2. The lighting or signaling device according to claim 1, wherein said exit face extends transversely to, or obliquely with respect to, said entry edge.

3. The lighting or signaling device according to claim 2, wherein said sheet lies between two large faces parallel to each other.

4. The lighting or signaling device according to claim 2, wherein said at least one light source has a large dimension that is disposed substantially perpendicular to the longitudinal direction of said entry edge, said thickness of said sheet being at least equal to the large dimension of said at least one light source in order to cover said at least one light source completely.

5. The lighting or signaling device according to claim 2, wherein said at least one light source is formed by several light emitting diodes aligned substantially perpendicular to the longitudinal direction of said entry edge.

6. The lighting or signaling device according to claim 1, wherein said sheet lies between two large faces parallel to each other.

7. The lighting or signaling device according to claim 1, wherein said at least one light source has a large dimension that is disposed substantially perpendicular to the longitudinal direction of said entry edge, the thickness of said sheet being at least equal to the large dimension of said at least one light source in order to cover said at least one light source completely.

8. The lighting or signaling device according to claim 1, wherein said at least one light source is formed by several light emitting diodes aligned substantially perpendicular to the longitudinal direction of said entry edge.

9. The lighting or signaling device according to claim 1, wherein said exit face is situated in a plane substantially orthogonal to said optical axis and said curved rear edge has a parabolic shape having a focus situated on said at least one light source.

10. The lighting or signaling device according to claim 9, wherein said sheet is planar and disposed vertically, horizontally or obliquely.

11. The lighting or signaling device according to claim 9, in which said entry edge is in a horizontal plane and said exit face is vertical, wherein said focus of said parabolic rear edge is situated on the rear end of said at least one light source so that the emerging rays are horizontal or are directed downwards below a cutoff line.

12. The lighting or signaling device according to claim 1, wherein said lighting or signaling device further comprises an end piece extending said exit face and having, in section through a plane parallel to said entry edge, a convex convergent lens shape making it possible to at least partially collimate the light in a plane substantially parallel to said entry edge.

13. The lighting or signaling device according to claim 1, wherein said lighting or signaling device further comprises several sheets up against each other, said sheets being contiguous above said at least one light source and separating progressively to make it possible to juxtapose exit end pieces.

14. The lighting or signaling device according to claim 12, wherein said lighting or signaling device further comprises three sheets up against each other, namely a planar central sheet lying between two lateral sheets delimited by portions of spherical surfaces.

15. The lighting or signaling device according to claim 1, wherein the profile of said exit face is convex towards the front while the profile of said curved rear edge is associated for an exit of said light rays parallel to said optical axis.

16. The lighting or signaling device according to claim 15, wherein the profile of said exit face is elliptical and convex towards the front, while said curved rear edge is convex towards the rear in the form of an arc of a hyperbola, a first focus of which is merged with the focus of the elliptical profile and a second focus of which corresponds to the virtual image of the first focus given by said curved rear edge.

17. The lighting or signaling device according to claim 1, wherein:
    said sheet has a through opening with a closed contour, delimited in its bottom part by a parabolic edge, the focus of which is situated at the point where said at least one light source is placed and the geometric axis of which is merged with said optical axis, the top profile of the opening being chosen so as to be able to have said light rays emitted towards the rear pass round it, and
    in order to provide a double internal reflexion of said light rays directed towards the rear, said curved rear edge of said sheet has a first total reflection part and a second also total reflection part returning said light rays parallel to said entry edge.

18. The lighting or signaling device according to claim 17, wherein the first total reflection part of said curved rear edge of said sheet is formed by a secondary parabola, the focus of which is merged with that of the parabolic edge but whose axis is directed upwards, while the second total reflection part of said curved rear edge is formed by a straight top face.

19. The lighting or signaling device according to claim 1, wherein the angle at which said curved rear edge of said sheet is seen from said at least one light source extends on each side of the normal to the at least one light source at least at an angle equal to or greater than 30°.

20. The lighting or signaling device according to claim 1, wherein there is interposed between said at least one light source and said entry edge of said sheet at least one optical element of the optical conduit or optical collector type.

21. The lighting or signaling device according to claim 1, wherein said curved shape of said curved rear edge is associated with said profile of said exit face so that a majority of said light rays emerging from said exit face have a direction contained in said substantially horizontal plane containing said optical axis of said lighting or signaling device.

22. The lighting or signaling device according to claim 1, wherein said curved shape of said curved rear edge is associated with said profile of said exit face so that all of said light rays emerging from said exit face have a direction contained in said substantially horizontal plane containing said optical axis of said lighting or signaling device.

23. The lighting or signaling device according to claim 1, wherein the angle at which said curved rear edge of said sheet is seen from said at least one light source extends on each side of the normal to said at least one light source at least at an angle equal to or greater than or is substantially 35°.

24. The lighting or signaling device according to claim 1, wherein the angle at which said curved rear edge of said sheet is seen from said at least one light source extends on each side of the normal to said at least one light source at least at an angle equal to or greater than or is substantially 40°.

25. The lighting or signaling device according to claim 1, wherein said end piece is an integral single piece with said sheet.

26. The lighting or signaling device according to claim 1, wherein said end piece is attached to said exit face.

27. The lighting or signaling device according to claim 1, wherein said sheet has a constant thickness.

28. A lighting or signalling device for a motor vehicle, said lighting or signaling device comprising:

an optical axis and comprising at least one light source and at least one light guide for light rays between said at least one light source and an exit face, said at least one light guide having an entry edge associated with said at least one light source;

said at least one light guide for said light rays is formed by a sheet that is generally planar;

said sheet comprising a curved rear edge convex towards the rear, able to provide reflection of said light rays towards said exit face;

said curved rear edge having a curved shape and being associated with a profile of said exit face so that at least some of said light rays emerging from said exit face have a direction contained in a substantially horizontal plane containing the optical axis of said lighting or signalling device;

wherein said at least one light guide comprises an end piece extending said exit face and having, in section through a plane parallel to the entry edge, a convex convergent lens shape making it possible to at least partially collimate the light in a plane substantially parallel to the entry edge, said convex convergent lens shape being defined by a surface that is generally convex relative to said exit face and having a focus situated generally at said exit face of said sheet; and said end piece being formed by a solid having a cylindrical, elliptical or pseudo-elliptical profile in cross-section that defines said convex surface and that causes divergence of at least some of said light rays;

said exit face of said sheet being disposed at said focus to partially collimate emerging light rays from said end piece and allows said divergence of at least some of said light rays;

wherein said lighting or signaling device is adapted for use on a motor vehicle.

29. The lighting or signaling device according to claim 28, wherein said end piece is an integral single piece with said sheet.

30. The lighting or signaling device according to claim 28, wherein said end piece is attached to said exit face.

31. The lighting or signaling device according to claim 28, wherein said sheet has a constant thickness.

\* \* \* \* \*

UNITED STATES PATENT AND TRADEMARK OFFICE
CERTIFICATE OF CORRECTION

PATENT NO. : 8,920,006 B2  
APPLICATION NO. : 12/244864  
DATED : December 30, 2014  
INVENTOR(S) : Antoine de Lamberterie Page 1 of 1

It is certified that error appears in the above-identified patent and that said Letters Patent is hereby corrected as shown below:

In the specification

Column 10, line 24, delete "r5" and insert -- r15 -- therefor.

In the claims

Claim 1, Column 11, line 39, delete "be" and insert -- being -- therefor.

Signed and Sealed this  
Eighth Day of December, 2015

Michelle K. Lee  
*Director of the United States Patent and Trademark Office*